(12) United States Patent
Miyako et al.

(10) Patent No.: US 7,893,403 B2
(45) Date of Patent: Feb. 22, 2011

(54) RADIATION IMAGE CAPTURING APPARATUS

(75) Inventors: Kuniaki Miyako, Minami-ashigara (JP);
Hajime Nakata, Minami-ashigara (JP);
Kazuo Hakamata, Odawara (JP);
Yasunori Ohta, Yakohama (JP)

(73) Assignee: Fujifilm Corporation, Tokyo (JP)

( * ) Notice: Subject to any disclaimer, the term of this patent is extended or adjusted under 35 U.S.C. 154(b) by 0 days.

(21) Appl. No.: 12/207,213

(22) Filed: Sep. 9, 2008

(65) Prior Publication Data
US 2009/0072140 A1 Mar. 19, 2009

(30) Foreign Application Priority Data
Sep. 14, 2007 (JP) .............................. 2007-238950

(51) Int. Cl.
*G01T 1/00* (2006.01)
(52) U.S. Cl. .................................................. 250/336.1
(58) Field of Classification Search .............. 250/336.1, 250/370.09, 208.1, 339.03, 339.04, 370.15; 330/254, 256
See application file for complete search history.

(56) References Cited

U.S. PATENT DOCUMENTS

| | | | |
|---|---|---|---|
| 5,508,740 A | * | 4/1996 | Miyaguchi et al. .......... 348/244 |
| 5,900,782 A | | 5/1999 | Igarashi et al. |
| 6,323,891 B1 | | 11/2001 | Kitani et al. |
| 6,407,390 B1 | * | 6/2002 | Rozsa .................... 250/363.01 |
| 6,515,285 B1 | * | 2/2003 | Marshall et al. ............. 250/352 |
| 7,140,766 B2 | * | 11/2006 | Glukhovsky et al. ........ 374/175 |
| 7,455,454 B2 | * | 11/2008 | Ikhlef et al. .................. 378/207 |
| 2001/0007348 A1 | * | 7/2001 | Kusaka et al. ............... 250/238 |
| 2007/0012897 A1 | * | 1/2007 | Lee et al. .................. 252/299.1 |
| 2009/0027127 A1 | * | 1/2009 | Muhammad et al. ........ 330/278 |

FOREIGN PATENT DOCUMENTS

| | | |
|---|---|---|
| JP | 09-289424 A | 11/1997 |
| JP | 11-345956 A | 12/1999 |
| JP | 2005-286776 A | 10/2005 |

\* cited by examiner

*Primary Examiner*—David P Porta
*Assistant Examiner*—Faye Boosalis
(74) *Attorney, Agent, or Firm*—Sughrue Mion, PLLC

(57) ABSTRACT

The invention relates to a radiation image capturing apparatus that includes a signal reading circuit for reading an image signal from a sensor substrate. The signal reading circuit includes a charge detecting circuit and a temperature sensor for detecting the temperature of the charge detecting circuit, and controls the gain of a variable gain amplifier of the charge detecting circuit based on the detected temperature.

8 Claims, 7 Drawing Sheets

RADIATION IMAGE CAPTURING APPARATUS

BACKGROUND OF THE INVENTION

1. Field of the Invention

The present invention relates to a radiation image capturing apparatus that captures radiation image information of a subject with a radiation image information detector.

2. Description of the Related Art

In the medical field, for example, a radiation image capturing apparatus is extensively used, which exposes a subject (patient) to radiation emitted from a radiation source and detects and processes the radiation passed through the subject with a radiation detector to obtain radiation image information.

Japanese Laid-Open Patent Publication No. 11-345956 discloses a radiation image information detector that allows acquisition of radiation image information of sufficient quality for proper diagnosis while reducing the radiation dose to the subject.

FIG. 7 schematically shows the configuration of the radiation image information detector 2 disclosed in Japanese Laid-Open Patent Publication No. 11-345956. The radiation image information detector 2 includes a grid 4 for removing the scattered component of the radiation that has passed through the subject, a phosphor plate 6 for converting the radiation that has passed through the grid 4 into visible light, and a sensor substrate 8 for converting the visible light emitted from the phosphor plate 6 into charge information associated with the radiation image information and storing the charge information. The grid 4, phosphor plate 6, and sensor substrate 8 are arranged in this order within a peripheral frame 9. Provided to the side of the sensor substrate 8 are driver ICs 10 for driving the sensor substrate 8, and reading ICs 12 for reading the radiation image information from the sensor substrate 8 driven by the driver ICs 10. The reading ICs 12 are provided with a heat pipe 14 for releasing the heat generated in the reading ICs 12 to the outside of the radiation image information detector 2. Japanese Laid-Open Patent Publication No. 11-345956 also discloses a mechanism for cooling the reading ICs 12 through use of a Peltier element instead of the heat pipe 14.

The output characteristics of an amplifier circuit, which is an electronic circuit, generally vary with temperature. In order to compensate for this temperature dependency, Japanese Laid-Open Patent Publication No. 09-289424, for example, discloses a variable amplifier circuit generating a reference current that varies with temperature. The reference current is used to cancel out the temperature dependency of a pair of amplifier transistors which make up the amplifier circuit. Further, the prior art disclosed in Japanese Laid-Open Patent Publication No. 2005-286776 is configured to cancel out the variation with temperature in the current provided from a differential amplifier circuit to a current mirror circuit.

In the medical field, a radiation image of high accuracy is required for proper diagnosis. The detector disclosed in Japanese Laid-Open Patent Publication No. 11-345956 cools the reading IC 12 with a cooling means that utilizes a heat pipe 14 or a Peltier element to achieve stable readout of the radiation image information by the reading IC 12. In this case, however, since the heat is released only by means of the heat pipe 14, the temperature of the reading IC 12 may still vary with the ambient temperature, which makes the characteristics of the reading IC 12 unstable and hinders the acquisition of a high accuracy radiation image. Further, the space required for the heat pipe 14 causes an increase in the size of the radiation image information detector 2, making the detector 2 difficult to handle and transport. Use of the Peltier element instead of the heat pipe 14 allows the reading IC 12 to remain at a constant temperature irrespective of the ambient temperature. However, heat release and space for the Peltier element itself are still required.

When a compensation circuit that compensates for the temperature dependency of the output characteristics of an amplifier circuit, such as the compensation circuits disclosed in Japanese Laid-Open Patent Publication Nos. 09-289424 and 2005-286776, is used, the characteristics of the compensation circuit have to match the characteristics of the amplifier circuit with high accuracy. However, since the temperature dependency of an electronic circuit is typically nonlinear, high-accuracy temperature compensation is considerably difficult to achieve. Thus, even when such a compensation circuit is applied to a radiation image information detector for detecting radiation image information, there is no guarantee that high-accuracy radiation image information will be acquired.

SUMMARY OF THE INVENTION

It is a general object of the invention to provide a radiation image capturing apparatus that has a compact and simple configuration and allows acquisition of high-accuracy radiation image information.

It is a main object of the invention to provide a radiation image capturing apparatus that contributes to downsizing of the apparatus.

It is another object of the invention to provide a radiation image capturing apparatus that allows acquisition of high-accuracy radiation image information irrespective of the ambient temperature.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Figure 1:
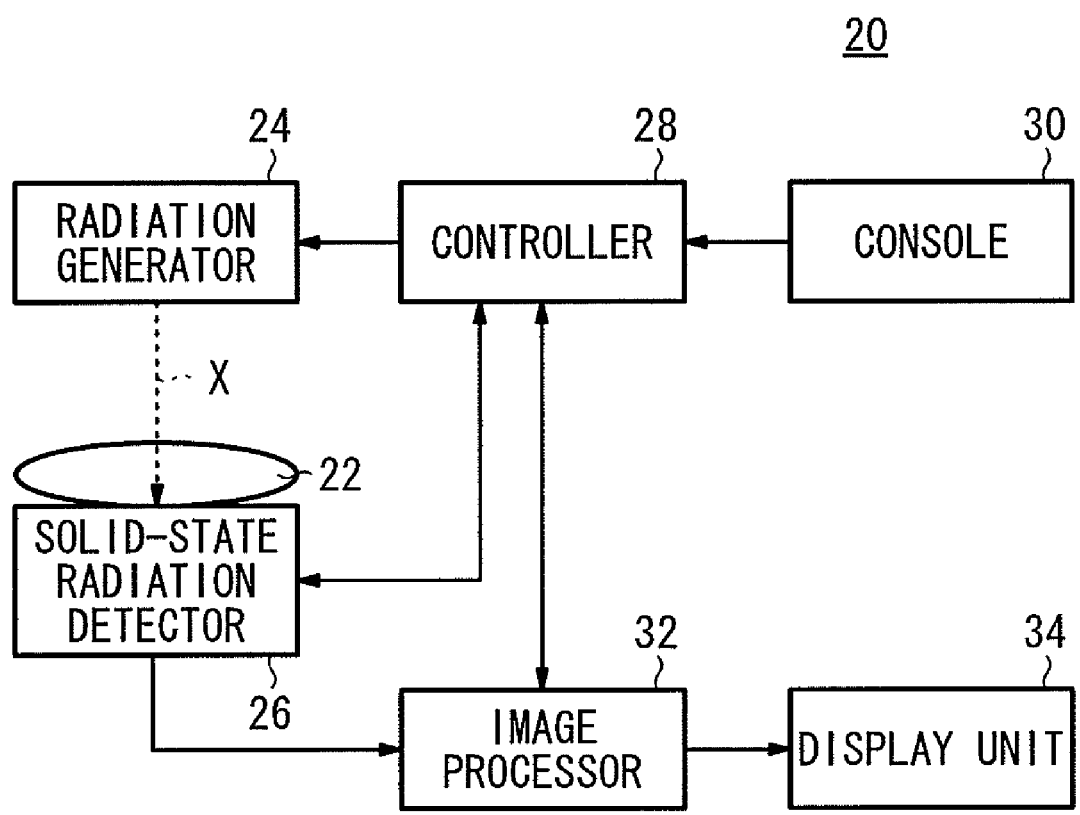
FIG. 1 is a block diagram illustrating the configuration of a radiation image capturing apparatus according to an embodiment of the invention.

FIG. 1 is a block diagram illustrating the configuration of a radiation image capturing apparatus 20 according to an embodiment of the present invention.

The radiation image capturing apparatus 20 includes a radiation generator 24 for generating radiation X to be applied to a subject 22, a solid-state radiation detector (radiation image information detector) 26 for detecting the radiation X that has passed through the subject 22, a controller 28 for controlling the radiation generator 24 and the solid-state radiation detector 26, a console 30 for setting on the controller 28 image capturing conditions such as the dose of radiation X to be applied to the subject 22, an image processor 32 for processing in a predetermined manner the radiation image information of the subject 22 read out from the solid-state radiation detector 26, and a display unit 34 for displaying the processed radiation image information.

Figure 2:
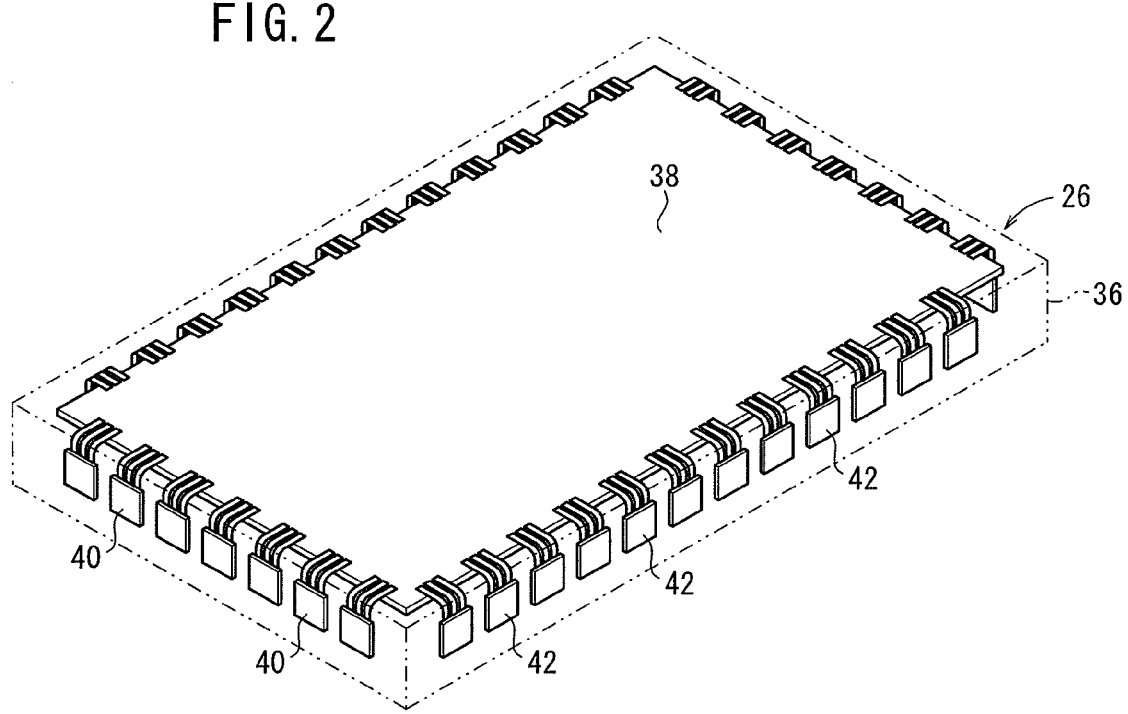
FIG. 2 schematically illustrates the configuration of the solid-state radiation detector of FIG. 1.

FIG. 2 is a schematic perspective view of the solid-state radiation detector 26. The solid-state radiation detector 26 includes a sensor substrate 38 contained in a protective case 36 to store the radiation image information generated by the radiation X that has passed through the subject 22 as two-dimensional charge information, a plurality of driver ICs 40 making up a gate driving circuit for driving gate lines connected to pixels which form the sensor substrate 38, and a plurality of reading ICs 42 making up a signal reading circuit for reading the charge information through signal lines from pixels connected to the gate line being activated.

Figure 3:
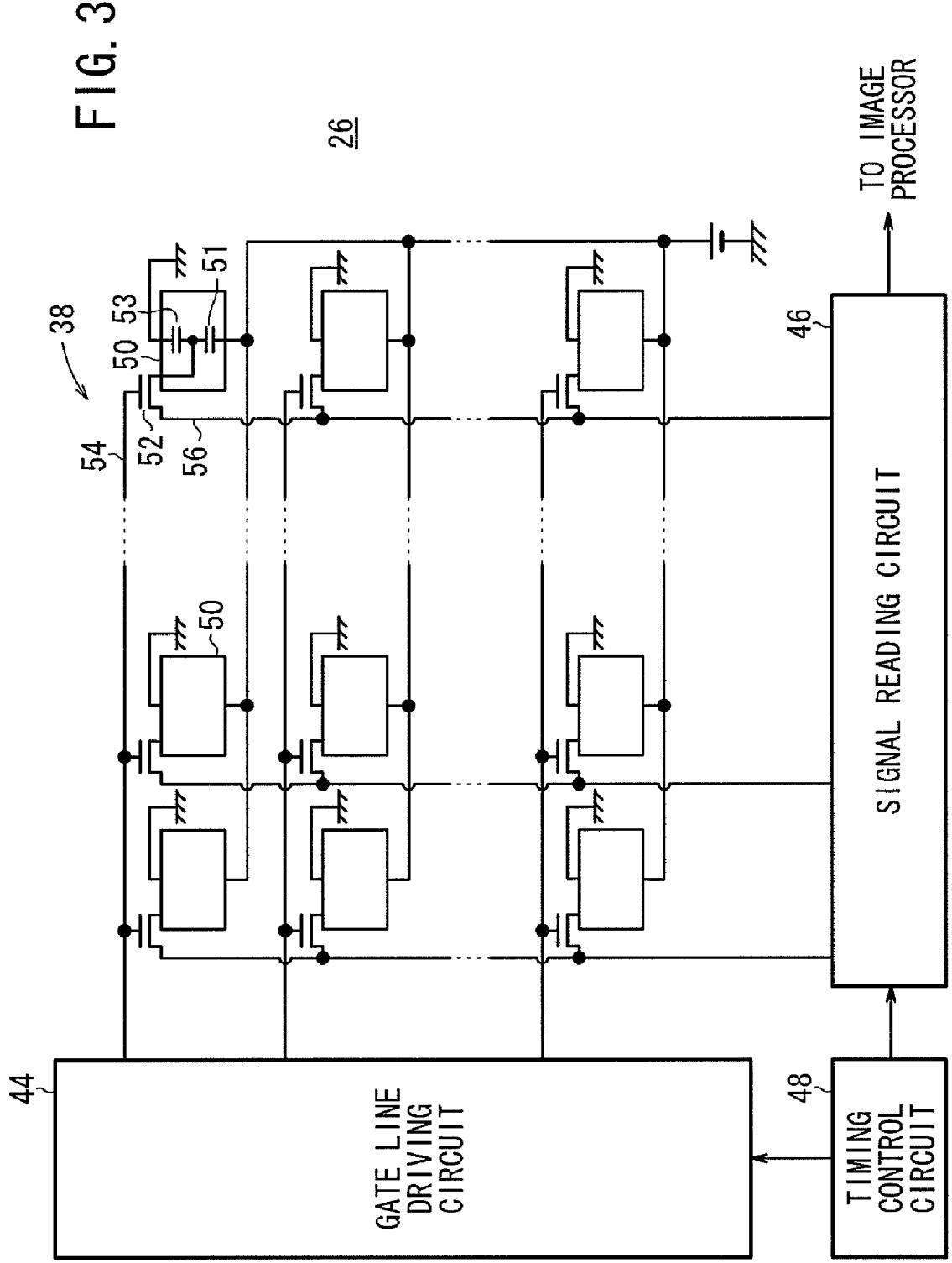
FIG. 3 is a block diagram illustrating the circuit configuration of the solid-state radiation detector of FIG. 1.

FIG. 3 is a block diagram illustrating the circuit configuration of the solid-state radiation detector 26. The solid-state radiation detector 26 includes the sensor substrate 38, a gate line driving circuit 44 having a plurality of driver ICs 40, a signal reading circuit 46 having a plurality of reading ICs 42, and a timing control circuit 48 for controlling the gate line driving circuit 44 and the signal reading circuit 46.

The sensor substrate 38 includes a plurality of Thin Film Transistors (TFTs) 52 arranged in a matrix form and a photoelectric conversion layer 51 placed over the array of the TFTs 52. The photoelectric conversion layer 51 is made of a material, such as amorphous selenium (a-Se), that generates charges upon detection of radiation X. The charges generated by the photoelectric conversion layer 51 are stored in storage capacitors 53 and then read out as image signals by sequentially switching ON each row of the TFTs 52. FIG. 3 only shows the connection between one pixel 50, which includes the photoelectric conversion layer 51 and the storage capacitor 53, and one TFT 52. The details of other pixels 50 are omitted for clarity. Note that the amorphous selenium shows performance degradation at high temperatures because of an inherent structural change, and the amorphous selenium must therefore be used within a predetermined temperature range. Each TFT 52 connected to a corresponding one of the pixels 50 is further connected to one gate line 54 extending parallel to the rows of the TFT array and one signal line 56 extending parallel to the columns of the TFT array. Each gate line 54 is connected to the gate line driving circuit 44, while each signal line 56 is connected to the signal reading circuit 46.

Figure 4:
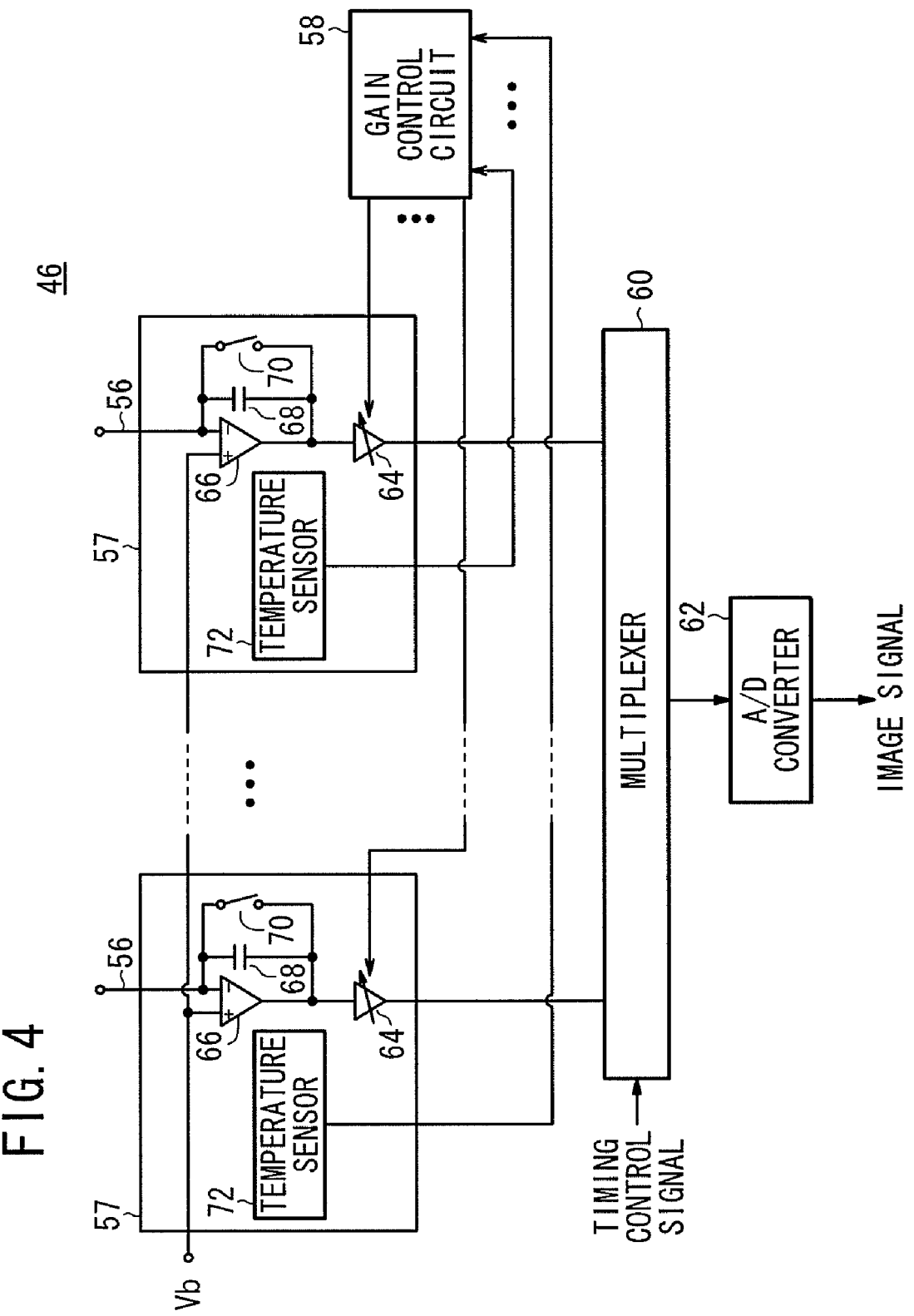
FIG. 4 is a detailed block diagram of the signal reading circuit of FIG. 3.

FIG. 4 is a block diagram illustrating the details of the signal reading circuit 46 which is constructed by a plurality of reading ICs 42. The signal reading circuit 46 includes a plurality of charge detecting circuits 57 connected to the signal lines 56 of the sensor substrate 38, and a gain control circuit 58 for controlling the gain of each charge detecting circuit 57. The signal reading circuit 46 further includes a multiplexer 60 that selects the pixels 50 connected to one signal line 56 designated by the timing control signal provided from the timing control circuit 48, and an A/D converter 62 that converts the radiation image information read out from the selected pixel 50 into a digital image signal for transmission to the image processor 32.

The charge detecting circuit 57 detects voltage signals by integrating the charge information provided from the signal line 56. The charge detecting circuit 57 includes an operational amplifier (integrating amplifier) 66, an integrating capacitor 68, and a switch 70. The charge detecting circuit 57 further includes a temperature sensor 72 for detecting the temperature of the charge detecting circuit 57, and a variable gain amplifier 64 for controlling the gain of the charge detecting circuit 57 in accordance with the temperature detected by the temperature sensor 72. The inverting input of the operational amplifier 66 is connected to the signal line 56, while the non-inverting input of the operational amplifier 66 is supplied with a reference voltage Vb. The temperature of each charge detecting circuit 57 detected by the temperature sensor 72 is supplied to the gain control circuit 58. The gain control circuit 58 controls the gain of the variable gain amplifier 64 based on the temperature of the charge detecting circuit 57 detected by the temperature sensor 72 to compensate for the gain variation at the detected temperature in the charge detecting circuit 57 so that the radiation image information associated with a predetermined temperature can be obtained. It should be noted that the gain control circuit 58 may be provided with a table that defines for each charge detecting circuit 57 the relation between the temperature of the charge detecting circuit 57 and the gain value of the variable gain amplifier 64 required to compensate for the gain variation.

The radiation image capturing apparatus 20 according to the embodiment of the invention is essentially configured as described above, and the operation thereof will now be described.

First, settings of ID information of the subject 22, image capturing conditions, or the like are made through the console 30. The ID information may include the name, age, gender, etc. of the subject 22 and can be acquired from an ID card of the subject 22. The image capturing conditions may include the image capturing site, the image capturing direction, and the like specified by the physician. The image capturing conditions may also include the dose of radiation X to be applied to the image capturing site. These image capturing conditions may be acquired from a higher-level apparatus on the network or entered through the console 30 by a radiologist.

Next, the image capturing site of the subject 22 is positioned against the solid-state radiation detector 26. Then, the controller 28 controls the radiation generator 24 in accordance with the specified image capturing conditions to expose the subject 22 to the radiation X. The radiation X that has passed through the subject 22 is converted by the photoelectric conversion layer 51 of each pixel 50, which makes up the sensor substrate 38 of the solid-state radiation detector 26, into electric signals that are stored in the corresponding storage capacitors 53 as charges (see FIG. 3). The charge information stored in each storage capacitor 53 and representing the radiation image information of the subject 22 is then read out in accordance with the timing control signals supplied to the gate line driving circuit 44 and signal reading circuit 46 by the timing control circuit 48.

More specifically, the gate line driving circuit 44 selects one of the gate lines 54 in accordance with the timing control signal provided by the timing control circuit 48 and supplies a driving signal to each base of TFTs 52 connected to the selected gate line 54. Meanwhile, the signal reading circuit 46 selects the signal lines 56 connected to the charge detecting circuit 57 one after another in the row direction using the multiplexer 60 in accordance with the timing control signals provided from the timing control circuit 48. The charge information associated with the radiation image information and stored in the storage capacitor 53 of the pixel 50 corresponding to both of the selected gate line 54 and signal line 56 is integrated by the operational amplifier 66 and the integrating capacitor 68, and then supplied to the A/D converter 62 through the variable gain amplifier 64 and the multiplexer 60 to be converted into a digital image signal and transmitted to the image processor 32. After the image signal from each pixel 50 arranged in the row direction has been read, the gate line driving circuit 44 selects the next gate line 54 in the column direction and supplies the driving signal to the selected gate line 54. The signal reading circuit 46 then reads out the image signals from the TFTs 52 connected to the selected gate line 54 in the manner described above. By repeating the operation described above, the two-dimensional radiation image information stored in the sensor substrate 38 is read out and provided to the image processor 32.

The temperature sensor 72 placed in each of the charge detecting circuits 57 making up the signal reading circuit 46 detects the temperature of the charge detecting circuit 57, and provides the detected temperature to the gain control circuit 58. The gain control circuit 58 controls the gain of the variable gain amplifier 64 based on the detected temperature so as to compensate for the gain variation at the temperature in the charge detecting circuit 57. This may be achieved, for example, by using a table indicating the gain value of the variable gain amplifier 64 required to compensate for the gain variation caused by the detected temperature. The gain compensation described above allows each charge detecting circuit 57 to provide, irrespective of the temperature of the circuit, the image signal that would be generated by the same charge detecting circuit 57 at a predetermined temperature.

It should be noted that when the range of temperature variation is small, and the temperature-dependent characteristics of the gain of the charge detecting circuit 57 can be approximated by a linear function, the gain G of the charge detecting circuit 57 may be calculated from $G = a \cdot \theta + b$, where $\theta$ is the temperature detected by the temperature sensor 72, and a and b are parameters representing the temperature-dependent characteristics of the charge detecting circuit 57. The gain of the variable gain amplifier 64 may be controlled so that the gain G of the charge detecting circuit 57 will be a set value at a predetermined temperature.

After being adjusted in the manner described and provided to the image processor 32, the radiation image information is subjected to a predetermined image processing, and displayed on the display unit 34 to enable diagnosis or the like. Thus, the present embodiment allows diagnosis to be performed based on a high-accuracy image that is not affected by temperature variation.

Figure 5:
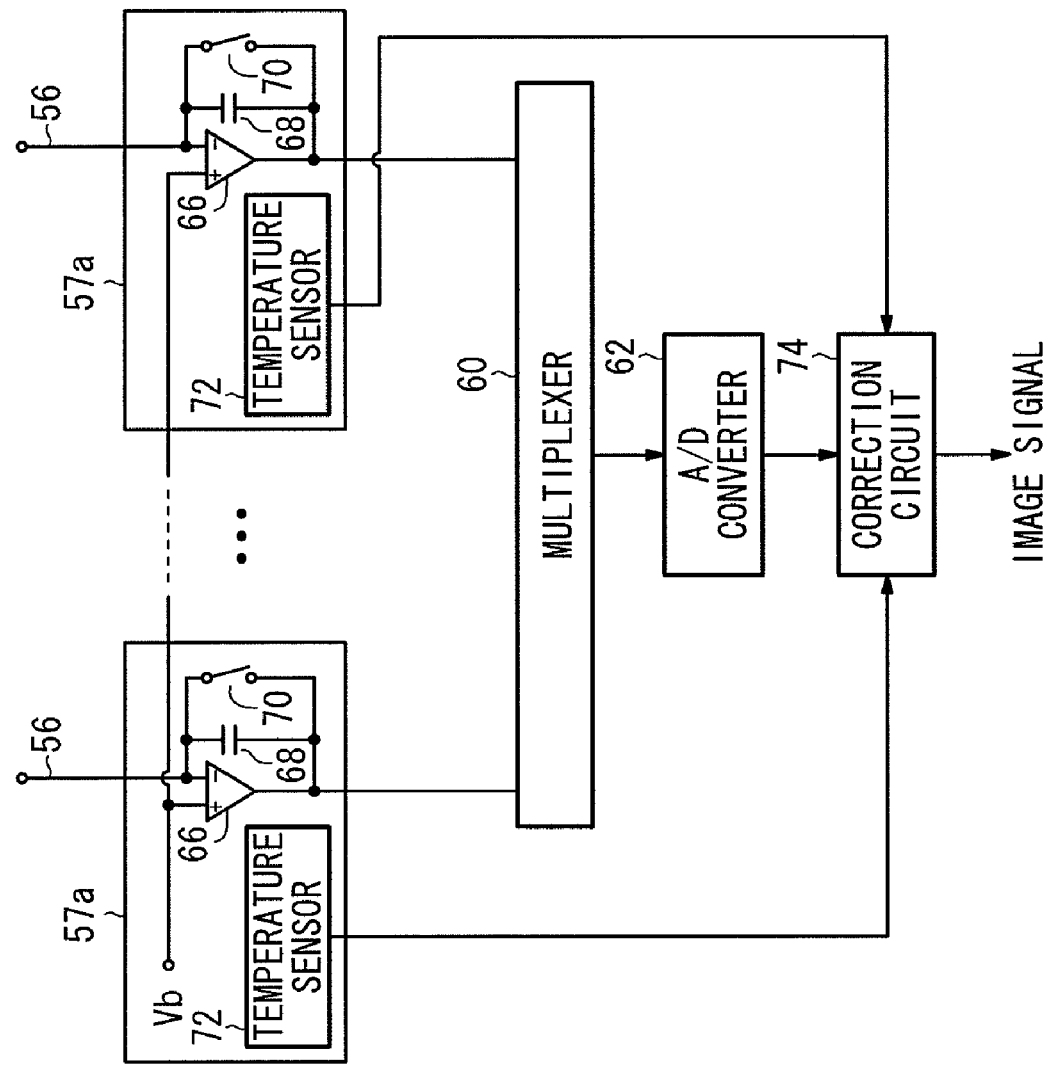
FIG. 5 is a detailed block diagram illustrating an alternative configuration of the signal reading circuit of FIG. 3.

FIG. 5 illustrates another signal reading circuit 46a according to the invention. Instead of utilizing the gain control circuit 58 and the variable gain amplifier 64 in order to control the gain in response to temperature variation of the charge detecting circuit 57, the signal reading circuit 46a converts the charge information detected by the charge detecting circuits 57a into digital image signals with the A/D converter 62 and then corrects the digital image signals by means of a correction circuit 74 in accordance with the temperature of each charge detecting circuit 57a detected by respective temperature sensors 72. In this case, the correction circuit 74 may correct the image signals by using, for example, a table which indicates the correction value required to compensate for the gain variation of the charge detecting circuit 57a caused by the detected temperature.

Figure 6:
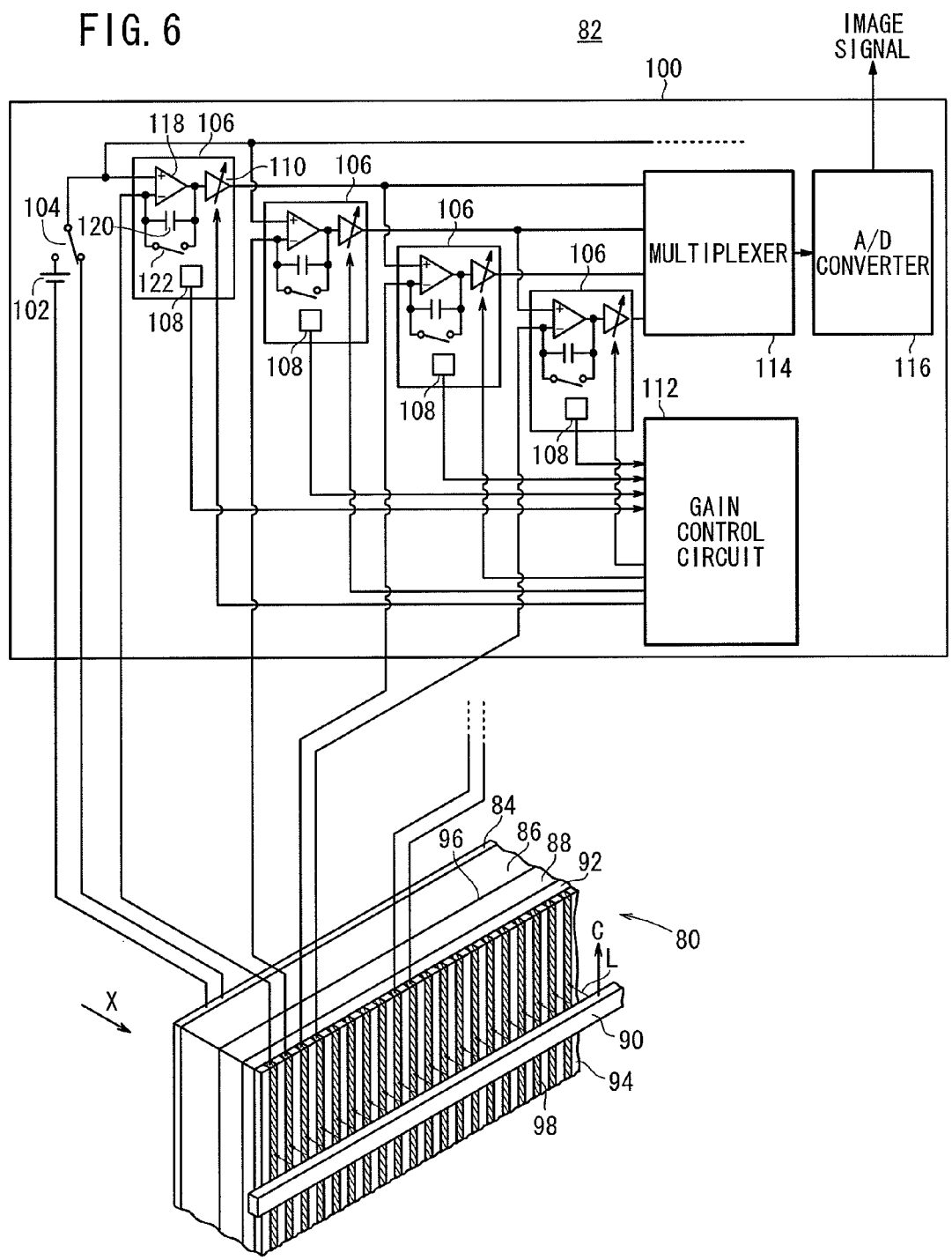
FIG. 6 illustrates a solid-state radiation detector according to another embodiment of the invention.
Figure 7:
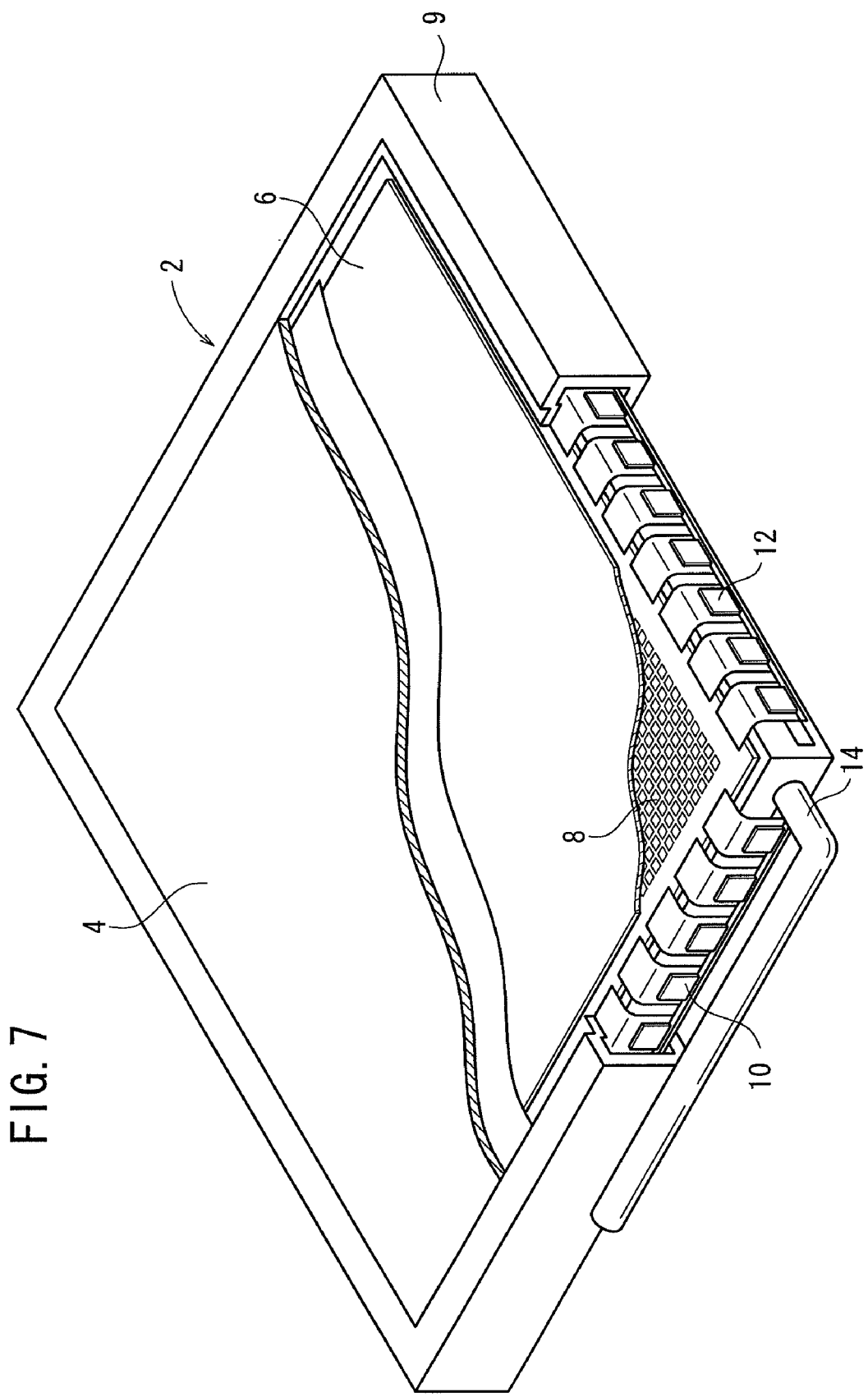
FIG. 7 schematically illustrates the configuration of a radiation image information detector according to the prior art.

FIG. 6 illustrates the configuration of a solid-state radiation detector 82 which is an alternative to the solid-state radiation detector 26 utilizing the TFTs 52 as shown in FIG. 3. The solid-state radiation detector 82 utilizes a sensor substrate 80 that stores the radiation image information as a latent image and allows readout of the latent image in the form of charge information when reading electromagnetic waves are applied.

The sensor substrate 80 includes, in the following order from the side exposed to radiation X, a first electrode layer 84 which is transparent to radiation X, a recording photoconductive layer 86 which exhibits conductivity upon exposure to radiation X, a charge transport layer 88 which substantially acts as an insulator to the latent image charge while substantially acting as a conductor to a transport charge of opposite polarity to the latent image charge, a reading photoconductive layer 92 which exhibits conductivity upon exposure to a reading light L from the reading light source 90, and a second electrode layer 94 which is transparent to the reading light L.

Charge storing portions 96 are formed at the interface between the recoding photoconductive layer 86 and the charge transport layer 88. The charge storing portions 96 store the charges generated in the recording photoconductive layer 86 as latent image charges. The second electrode layer 94 includes a plurality of linear electrodes 98 extending in a direction perpendicular to the direction in which the reading light source 90 extends (i.e., the direction indicated by arrow C). The first electrode layer 84 and the linear electrodes 98 of the second electrode layer 94 are connected to a signal reading circuit 100 for reading charge information associated with the latent image charges stored in the charge storing portions 96.

The signal reading circuit 100 includes a power source 102 and a switch 104 which cooperate to apply a predetermined voltage between the first electrode layer 84 and the second electrode layer 94 of the sensor substrate 80, a plurality of charge detecting circuits 106 connected with the linear electrodes 98 of the second electrode layer 94 to detect as voltage signals the latent image charges representing the radiation image information, a gain control circuit 112 for controlling the gain of each charge detecting circuit 106, a multiplexer 114 for sequentially selecting the outputs of the charge detecting circuits 106, and an A/D converter 116 for converting the analog image signal provided from the multiplexer 114 into a digital signal.

The charge detecting circuit 106 includes an operational amplifier 118, an integrating capacitor 120, a switch 122, a temperature sensor 108 for detecting the temperature of the charge detecting circuit 106, and a variable gain amplifier 110 for controlling the gain of the charge detecting circuit 106 in accordance with a gain control signal determined by the gain control circuit 112 based on the temperature detected by the temperature sensor 108. Further, the inverting input of the operational amplifier 118 is connected to the corresponding linear electrode 98, and the non-inverting input is connected to the first electrode layer 84 via the switch 104.

The sensor substrate 80 configured as above is connected via the switch 104 to the power source 102 so that a predetermined voltage is applied between the first electrode layer 84 and the second electrode layer 94 when the subject 22 is exposed to the radiation X. The radiation X that has passed through the subject 22 passes through the first electrode layer 84 and irradiates the recording photoconductive layer 86. The irradiated recording photoconductive layer 86 exhibits conductivity, and charge pairs are generated. The positive charge of the charge pair couples with the negative charge provided to the first electrode layer 84 from the power source 102 and thereby disappears. Meanwhile, the negative charges generated in the recording photoconductive layer 86 move toward the charge transport layer 88. Since the charge transport layer 88 substantially acts as an insulator to the negative charge, the negative charges accumulate in the charge storing portions 96 formed at the interface between the recording photoconductive layer 86 and the charge transport layer 88 to define a latent image.

After the latent image has been recorded to the sensor substrate 80, the signal reading circuit 100 reads out the radiation image information. First, the switch 104 is operated to connect the non-inverting input of the operational amplifier 118 of the charge detecting circuit 106 with the first electrode layer 84 of the sensor substrate 80.

The readout of the radiation image information, which is the charge information associated with the latent image, is carried out by moving the reading light source 90 in an auxiliary direction (the direction of arrow C) and thereby irradiating the reading light L over the reading photoconductive layer 92, while switching a switch 122 of the charge detecting circuit 106 ON and OFF in accordance with the predetermined pixel pitch in the auxiliary direction.

Applying the reading light L to the reading photoconductive layer 92 through the second electrode layer 94 causes the reading photoconductive layer 92 to exhibit conductivity, which results in generation of charge pairs. The positive charge of the charge pair moves through the charge transport layer 88, which substantially acts as a conductor to the positive charge, arrives at the charge storing portions 96. In the charge storing portions 96, the positive charge couples with the negative charge forming the latent image, and disappears. Meanwhile, the negative charges in the reading photoconductive layer 92 couple with the positive charges in the linear electrodes 98 of the second electrode layer 94, and disappear. A current is generated in the linear electrode 98 as the charges disappear, and the current is read out by the signal reading circuit 100 as charge information representing the radiation image information.

The current generated in each linear electrode 98 is integrated by the corresponding charge detecting circuit 106 and supplied to the multiplexer 114 as a voltage signal. The multiplexer 114 selects the charge detecting circuits 106 one after another in a main direction, i.e., the direction in which the linear electrodes 98 are disposed, to sequentially provide the voltage signals from the charge detecting circuits 106 to the A/D converter 116. The A/D converter 116 converts the analog voltage signal, which is the image signal, into a digital signal and provides it to the image processor 32 as the radiation image information. It should be noted that, when the radiation image information for one pixel in the auxiliary direction is read out, the switch 122 of the charge detecting circuit 106 is turned on to allow the charges stored in the integrating capacitor 120 to be discharged. The above mentioned operation is repeated while moving the reading light source 90 in the direction indicated by arrow C, to achieve two-dimensional readout of the radiation image information stored in the sensor substrate 80.

The temperature of each charge detecting circuit 106 is detected by corresponding temperature sensors 108 and provided to the gain control circuit 112. The gain control circuit 112 controls the gain of the variable gain amplifier 110 of each charge detecting circuit 106 in accordance with the temperature detected by the corresponding temperature sensor 108. Controlling the gain allows each charge detecting circuit 106 to provide to the image processor 32 through the multiplexer 114 and the A/D converter 116, the image signal that would be generated by the same charge detecting circuit 106 at a predetermined temperature. Thus, high-accuracy radiation images that are not affected by temperature variation can be displayed on the display unit 34.

It should be noted that the present invention is not limited to the embodiments mentioned above. It should be understood that various modifications may be made within the scope of the invention.

For example, instead of the solid-state radiation detectors 26 and 82 that convert the applied radiation X directly to the charge information, a radiation detector may be employed so that converts radiation X into visible light by means of a scintillator and then converts the visible light into charge information.

Further, although the temperature sensor 72 or 108 is provided to each charge detecting circuit 57, 57*a*, or 106 in the embodiments above, if the temperature differences between the charge detecting circuits 57, 57*a*, 106 are small, a single temperature sensor may be utilized for a plurality of charge detecting circuits 57, 57*a*, or 106 to control the gains of these circuits under the same temperature condition.

Further, the signal reading circuit 100 shown in FIG. 6 may be configured in a similar manner to the circuit shown in FIG. 5 so that a correction to the image signal is made, in accordance with the temperature of each charge detecting circuit 106 detected by the temperature sensor 108, after the image signal is converted into a digital signal by the A/D converter 116. In this case, the variable gain amplifier 110 of each charge detecting circuit 106 can be omitted.

Furthermore, instead of controlling the gain of the variable gain amplifier 64 of the charge detecting circuit 57, 57*a* or the variable gain amplifier 110 of the charge detecting circuit 106, the gain of the integrating circuit may be directly controlled.

What is claimed is:

1. A radiation image capturing apparatus, comprising:
   a radiation generator for generating radiation to be applied to a subject:
   a solid-state radiation detector for detecting the radiation that has passed through the subject;
   a sensor substrate including a plurality of pixels arranged in a matrix form, the sensor substrate being adapted to store radiation image information generated by the radiation that has passed through the subject as two-dimensional charge information;
   a plurality of gate lines connected corresponding to each row of the pixels;
   a plurality of signal lines connected corresponding to each line of the pixels;
   a gate line driving circuit for driving the plurality of gate lines successively;
   a reading circuit for reading the radiation image information through the signal lines from the pixels connected to the gate lines being activated;
   a plurality of charge detecting circuits connected corresponding to the signal lines in the reading circuit, the charge detecting circuits being adapted to detect the charge information supplied from the corresponding signal line as a voltage signal;
   a temperature sensor is provided in each of the charge detecting circuits for detecting temperature of the corresponding charge detecting circuit;
   a control circuit for controlling, based on the temperature of the corresponding charge detecting circuit detected by the temperature sensor in the charge detecting circuit, a signal of the radiation image information that is input to the reading circuit to a signal at a predetermined temperature; and
   an output circuit for outputting the radiation image information with the controlled signal.

2. The apparatus according to claim 1, wherein
the control circuit comprises a gain control circuit that controls a gain of the charge detecting circuit.

3. The apparatus according to claim 2, wherein the gain control circuit controls the gain by using a table providing a gain value required to compensate for gain variation at the detected temperature.

4. The apparatus according to claim 2, wherein the gain control circuit calculates the gain of the charge detecting circuit by a linear function of the temperature, and controls the gain to a set value at the predetermined temperature.

5. The apparatus according to claim 1, wherein the control circuit comprises a correction circuit for correcting the signal of the radiation image information read out from the reading circuit, based on the temperature of the reading circuit.

6. The apparatus according to claim 5, wherein the correction circuit performs correction of the radiation image information by using a table providing a correction value required to compensate for gain variation at the detected temperature.

7. The apparatus of claim 1, wherein the control circuit provides a feedback signal to the radiation image information detector, said feedback signal adjusted according to the temperature detected by the temperature sensor, to directly effect the signal of the radiation image information.

8. The apparatus of claim 1, wherein the control circuit applies a corrective signal adjustment to the radiation image information after the signal has undergone analog to digital conversion to correct the digital signal based on the temperature detected by the temperature sensor.

* * * * *